(12) United States Patent
Rombeaut et al.

(10) Patent No.: US 8,125,966 B2
(45) Date of Patent: Feb. 28, 2012

(54) METHODS FOR HANDING OVER, BY DOUBLE TRANSMISSION OF DATA, A CALL INVOLVING A MOBILE NODE IN A MICROMOBILITY OR MACROMOBILITY SITUATION IN AN IP COMMUNICATION NETWORK USING HIERARCHICAL MOBILITY MANAGEMENT

(75) Inventors: Jean-Pierre Rombeaut, Maubeuge (FR); Laurence Gras, Bures sur Yvette (FR)

(73) Assignee: Alcatel Lucent, Paris (FR)

( * ) Notice: Subject to any disclaimer, the term of this patent is extended or adjusted under 35 U.S.C. 154(b) by 657 days.

(21) Appl. No.: 11/476,610

(22) Filed: Jun. 29, 2006

(65) Prior Publication Data

US 2007/0025323 A1 Feb. 1, 2007

(30) Foreign Application Priority Data

Jun. 30, 2005 (FR) ..................................... 05 51834

(51) Int. Cl.
*H04W 4/00* (2009.01)
(52) U.S. Cl. ........ 370/338; 709/238; 370/328; 370/401; 370/349
(58) Field of Classification Search .................. 709/238; 340/825.07; 370/338, 328, 401, 349
See application file for complete search history.

(56) References Cited

U.S. PATENT DOCUMENTS

| 5,936,540 A | * | 8/1999 | Lebet | .............................. 340/3.5 |
| 2003/0018810 A1 | * | 1/2003 | Karagiannis et al. | ......... 709/238 |
| 2004/0156347 A1 | * | 8/2004 | Kim | .............................. 370/338 |

FOREIGN PATENT DOCUMENTS

EP 1 434 396 6/2004

OTHER PUBLICATIONS

Karim El Malki et al: "Simultaneous Bindings for Mobile IPv6 Fast Handovers" IETF, May 2003, XP015012878.

* cited by examiner

*Primary Examiner* — Charles Appiah
*Assistant Examiner* — Alexander Yi
(74) *Attorney, Agent, or Firm* — Harness, Dickey & Pierce, P.L.C.

(57) ABSTRACT

A call handover method for an Internet Protocol communication network using hierarchical mobility management comprising a mobility anchor point connected to first and second access routers and to a home agent of a mobile node having first local and regional care-of addresses and communicating with another node consists in, if the mobile node detects the second access router: i) communicating the address prefix of the second access router to the mobile node in order for it to construct a second local care-of address, ii) communicating the second local care-of address, the first regional care-of address and an information bit having a value indicating double temporary addressing to the anchor point in order for it to store the second local care-of address in corresponding relationship to the first regional care-of address and then forward packets addressed to the mobile node to the first and second access routers, and iii) disconnecting the mobile node from the first access node and then deleting the first local care-of address of the mobile node stored at the anchor point in order to forward packets that are addressed to it to the mobile node via the home agent equipment, the anchor point and the second access router.

20 Claims, 2 Drawing Sheets

METHODS FOR HANDING OVER, BY DOUBLE TRANSMISSION OF DATA, A CALL INVOLVING A MOBILE NODE IN A MICROMOBILITY OR MACROMOBILITY SITUATION IN AN IP COMMUNICATION NETWORK USING HIERARCHICAL MOBILITY MANAGEMENT

CROSS-REFERENCE TO RELATED APPLICATIONS

This application is based on French Patent Application No. 0551834 filed Jun. 30, 2005, the disclosure of which is hereby incorporated by reference thereto in its entirety, and the priority of which is hereby claimed under 35 U.S.C. §119.

BACKGROUND OF THE INVENTION

1. Field of the Invention

The invention relates to Internet Protocol (IP) communication networks supporting hierarchical mobility management (i.e. comprising hierarchically organized points of presence (also known as home agents (HA)) and anchor points (also known as mobility anchor points (MAP))), and more precisely handover (call transfer) between access equipments of these networks involving at least one mobile (communication) equipment.

In the present context the expression "IP network" refers to a federation of subsets of IP networks (or IP subnetworks) interconnected by access equipments forming nodes, such as access routers.

In the present context, the expression "IP network using hierarchical mobility management" refers to an IP network in which calls between a mobile equipment (or node) and a communication equipment are effected via an agent equipment providing the home agent (HA) (or native) function for the mobile equipment, for example a home (or native) router, a mobility anchor point (MAP), for example a router, and a radio access equipment, for example an access router.

In the present context, the expression "mobile communication equipment" and the expression "mobile node" refer to any mobile (or portable) radio communication equipment (referred to hereinafter as a mobile equipment) capable of connecting to its home (sub)network (subnet) (or native subnetwork) or other subnetworks, referred to as remote (or external or foreign) subnetworks or visited networks, in order to exchange data in the form of signals with another communication equipment or with a subnetwork, for example, mobile telephones, laptop computers or personal digital assistants (PDA) equipped with a communication module.

2. Description of the Prior Art

Each mobile equipment that connects to an IP network has an IP home address (or IP native or permanent address) that corresponds to the prefix of the home (sub)network to which it is usually connected. When a mobile equipment is connected to its home network, data packets (or datagrams) sent to it are sent directly to its IP home address using a standard hop-by-hop type routing protocol. When the mobile equipment is roaming and wishes to connect to a remote (or external) subnetwork, it must configure itself with local and regional care-of (or complementary) addresses, known as care-of addresses, constructed from an address prefix supplied by the IP network, for example by means of a standard IPv6 mechanism, such as stateful or stateless autoconfiguration. These care-of addresses must be associated with the IP home address at the time of a binding update procedure effected between the mobile equipment and its home agent.

The person skilled in the art knows that there exist in the IP networks cited above IP mobility protocols, for example MIPv6, for ensuring that a mobile equipment can be contacted at any time and for ensuring the continuity of mobile equipment calls in progress, in particular during phases of transfer (handover) between access routers. Thus these protocols enable mobile equipments to maintain their connection to the Internet during handover and to continue to communicate with other equipments after changing their access (or attachment) point. However, they necessitate protocol operations and exchanges of signaling that introduce a phase during which the mobile equipment is no longer able to send or receive data packets (or datagrams).

A fast version FMIPv6 of MIPv6 has been proposed to limit the duration of this phase in which it is impossible to exchange packets, but only for handover between first and second access equipments connected to the same mobility anchor point, i.e. micromobility situations (in which mobility is limited to a single site (or anchor point) and is therefore characterized by local movements). It is therefore not applicable to handovers between first and second access equipments connected to first and second mobility anchor points, respectively, i.e. macromobility situations. Furthermore, FMIPv6 can only redirect a portion of the traffic which, on the one hand, does not limit sufficiently the duration of the phase in which it is impossible to exchange packets during a handover and, on the other hand, can lead to loss of packets.

Thus an object of the invention is to remedy the drawback cited above.

SUMMARY OF THE INVENTION

To this end the invention proposes a first method of handing over a call involving at least one mobile equipment (in a micromobility situation) between first and second radio access equipments connected to the same mobility anchor equipment (or point) itself connected to a home agent equipment providing the home (or native) agent function for the mobile equipment in an Internet Protocol (IP) communication network using hierarchical mobility management.

This first method consists in carrying out the following combination of steps if the mobile equipment while roaming detects a second radio access equipment connected to the anchor point each time the mobile equipment has established an IP call with another communication equipment via the home agent equipment, the anchor point and a first radio access equipment:

i) communicating the address prefix of the second access equipment to the mobile equipment in order for it to construct a second local care-of address on the basis thereof, ii) communicating the second local care-of address, the first regional care-of address and an information bit having a value indicating double temporary addressing to the anchor point in order for it to store the second local care-of address in corresponding relationship to the first regional care-of address and then forward packets addressed to the mobile equipment to the first and second access equipments designated by the first and second local care-of addresses, and iii) disconnecting the mobile equipment from the first access equipment and then deleting the first local care-of address of the mobile equipment stored at the anchor point in order to forward packets that are addressed to it to the mobile equipment via the home agent equipment, the anchor point and the second access equipment.

The first method of the invention may have other features and in particular, separately or in combination:

in the step i) the second access equipment can send the mobile equipment a router advertisement type message including at least its address prefix (or network address) and preferably the address of the anchor point to which it is connected;

in the step i) the mobile equipment can construct its second local care-of address by means of a stateless autoconfiguration procedure;

in the step ii) the mobile equipment can communicate the second local care-of address, the first regional care-of address and the information bit to the anchor point by means of a local binding update type message. The anchor point can then send a local binding acknowledgement type message to the mobile equipment after storing the second local care-of address in corresponding relationship to the first regional care-of address;

in the step iii) the mobile equipment can send a local binding update type message to the anchor point including its first local and regional care-of addresses and requesting it to delete the record corresponding thereto so that it retains only the record of the second local care-of address in corresponding relationship to the first regional care-of address. The anchor point can then send a local binding acknowledgement type message to the mobile equipment after deleting the record of the second local care-of address in corresponding relationship to the first regional care-of address.

The invention also proposes a second method of handing over a call involving at least one mobile equipment (in a macromobility situation) between first and second radio access equipments connected to respective first and second mobility anchor equipments (or points) themselves connected to the same home agent equipment providing the home (or native) agent function for the mobile equipment in an Internet Protocol (IP) communication network using hierarchical mobility management.

The second method consists in carrying out the following combination of steps if the mobile equipment while roaming detects the second access equipment connected to the second anchor point itself connected to the home agent equipment each time the mobile equipment has established an IP call with another communication equipment via the home agent equipment, the anchor point and a first radio access equipment:

i) communicating the address prefix of the second access equipment to the mobile equipment in order for it to construct second local and regional care-of addresses on the basis thereof, ii) communicating the second local and regional care-of addresses to the first anchor point in order for it to store the second local care-of address in corresponding relationship to the second regional care-of address, iii) communicating the second regional care-of address, an IP home address of the mobile equipment and an information bit having a value indicating double temporary addressing to the home agent equipment in order for it to store the second regional care-of address in corresponding relationship to the IP home address and then forward packets addressed to the mobile equipment to the first and second anchor points designated by the first and second regional care-of addresses stored in corresponding relationship to the IP home address, and iv) disconnecting the mobile equipment from the first access equipment and then deleting the first regional care-of address of the mobile equipment stored at the home agent equipment in corresponding relationship to the IP home address in order to forward packets that are addressed to it to the mobile equipment via the home agent equipment, the second anchor point and the second access equipment.

The second method of the invention may have other features and in particular, separately or in combination:

in the step i) the second access equipment can send via each of its interfaces the mobile equipment a router advertisement type message including at least its address prefix (or network address) and preferably the address of the anchor point to which it is connected;

in the step i) the mobile equipment can construct its second local and regional care-of addresses by means of a stateless autoconfiguration procedure;

in the step ii) the mobile equipment can communicate the second local and regional care-of addresses to the second anchor point by means of a binding update type message. The second anchor point can then send a binding acknowledgement type message to the mobile equipment after storing the second local care-of address in corresponding relationship to the second regional care-of address;

in the step iii) the mobile equipment can send the second regional care-of address, IP home address and information bit to the home agent equipment by means of a binding update type message. The home agent equipment can then send a binding acknowledgement type message to the mobile equipment after storing the second regional care-of address in corresponding relationship to the IP home address and the first regional care-of address;

in the step iv) the mobile equipment can send to the home agent equipment a binding update message including its first regional care-of address and its IP home address and requesting it to delete the record of the first regional care-of address so that it retains only the record of the second regional care-of address in corresponding relationship to the IP home address. The home agent equipment can then send to the first mobile equipment a binding acknowledgement type message after deleting the record of the first regional care-of address.

The invention also proposes a mobility anchor point adapted to implement a portion of a first handover method of the above kind.

The invention further proposes a home agent equipment adapted to implement a portion of a second handover method of the above kind.

The invention is particularly well adapted to IPv6 (IP version N° 6) type networks. However, it relates equally to IPv4 type networks supporting hierarchical mobility management.

Other features and advantages of the invention will become apparent on reading the following detailed description and examining the appended drawings.

IN THE DRAWINGS

DETAILED DESCRIPTION OF THE PREFERRED EMBODIMENTS

The appended drawings may not only constitute part of the description of the invention but also, if necessary, contribute to defining the invention.

An object of the invention is to avoid the loss of data packets and to shorten the phase during which a mobile communication equipment (or mobile node) is no longer able to send or receive data packets during handover between radio access equipments connected (or attached) to mobility anchor equipments (or points), which may be different, in an Internet Protocol (IP) communication network using hierarchical mobility management (i.e. comprising hierarchically organized points of presence (home agents (HA) and mobility anchor points (MAP)).

An IPv6 type IP network is considered hereinafter by way of nonlimiting example that supports the HMIPv6 (Hierarchical Mobile IPv6) mobility management protocol, like its network equipments and the mobile communication equipments (or mobile nodes) that can connect to it. However, the invention applies equally to IPv4 type IP networks, in particular by changing the messages used for updating the binding caches.

The mobile communication equipments (referred to hereinafter as mobile equipments (or nodes)) considered hereinafter by way of nonlimiting example are personal digital assistants (PDA) equipped with a communication module, for example of the WiFi or WiMAX—IEEE 802.1x type. However, the invention is not limited to this type of mobile equipment. It relates to any type of mobile (or portable) radio communication equipment capable of connecting to its home (sub)network (or native subnetwork) or to other remote subnetworks (or external subnetworks or visited networks) in order to exchange data in the form of signals with another (fixed or mobile) communication equipment or with a subnetwork, for example a mobile telephone, a router or a laptop computer equipped with a communication module.

Figure 1:
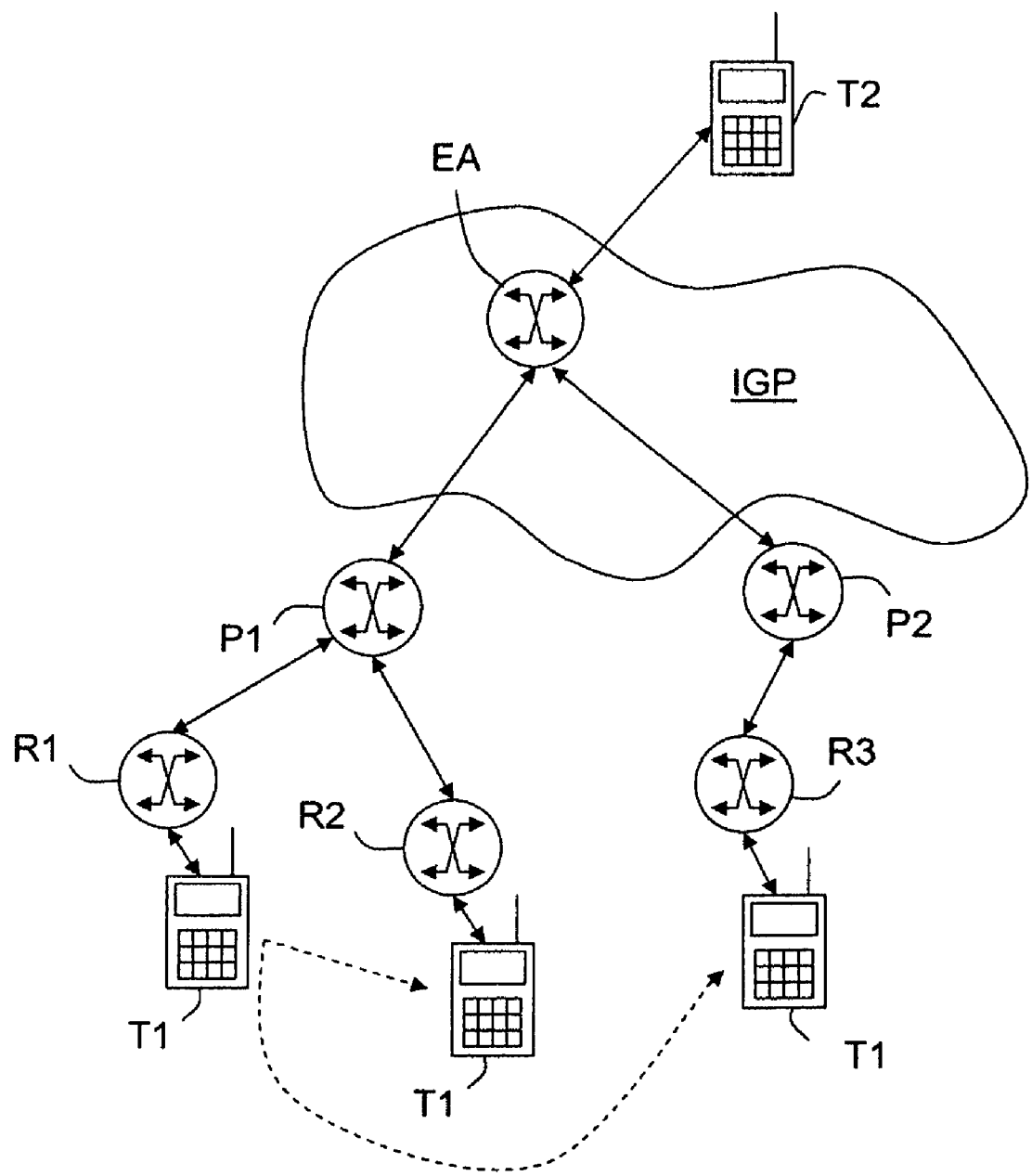
FIG. 1 is a diagram of a portion of an IP network of the invention using hierarchical mobility management.

An IP network using hierarchical mobility management that can implement the handover methods of the invention is described briefly first with reference to FIG. 1.

An IP network may be considered as a federation of subsets of IP networks (or IP subnetworks), here represented by the balloon labeled IGP (Interior Gateway Protocol) and generally comprising a main subnetwork (for example a home (or native) network) of at least one mobile node T1 to which other subnetworks (or access networks) are connected.

In the present context, the expression "home (or native) network" refers to the subnetwork to which a mobile node T1 is usually connected, i.e. the subnetwork on which it has an IP home (or native) address that corresponds to its prefix.

Each mobile node is associated with a home agent equipment EA constituting its home agent, for example a router, belonging to its home network. The IP home address of a mobile node is stored by its home agent. The home agent equipment EA generally stores all the position (and location) information in respect of the mobile node associated with it, i.e. the mobility data concerning that node, and provides a place of transit for data packets (or datagrams) that must be transmitted to it when it is connected to a remote IP subnetwork (or visited network) other than its home network (as is the case in the FIG. 1 example).

The stored mobility data may include what the person skilled in the art calls local and regional IP temporary addresses (or complementary addresses or care-of addresses). These IP local care-of address (LCoA) and IP regional care-of address (RCoA) are unicast type routing addresses used respectively by the access router R1 (to which a mobile node T1 is temporarily connected) and the (mobility) anchor point P1 (to which the access router R1 is connected and which is connected to the home agent EA of the mobile node T1) to contact said mobile node T1. The home agent knows only the regional care-of address (RCoA) of each mobile node T1 associated with it.

The IP local care-of addresses (LCoA) and IP regional care-of addresses (RCoA) are determined by the mobile node T1 from the (IP) address prefix of the access router to which it is connected, for example by means of a standard IPv6 mechanism such as a stateful or stateless autoconfiguration. When a mobile node T1 is connected to an access router R1 of a remote subnetwork, it must inform its home agent EA in order for it to store its regional care-of IP address RCoA in corresponding relationship to its IP home address. To do this it uses a binding update procedure managed by the mobility protocol (MIPv6). Using this IP regional care-of address RCoA, a home agent EA is able to send a mobile node T1 associated with it data packets (or datagrams) that a calling node T2 has sent to its IP home address. More precisely, each packet sent to the IP home address of a mobile node T1 temporarily connected to a remote subnetwork is intercepted by its home agent EA and then forwarded via a tunnel passing through the anchor point P1 to which its access router R1 is connected and through said access router R1 to said mobile node T1 at the IP regional care-of address RCoA associated (in its database) with its IP home address.

The invention proposes two handover methods involving a mobile first node T1 and a second node T2 (which may also be a mobile node) between a first access router R1 to which the first mobile node T1 is temporarily connected and which is connected to a first anchor point P1 itself connected to the home agent EA of the first mobile node T1 and a second access router R2 or R3 to which the first mobile node T1 is directed and which is connected to the first anchor point P1 (micromobility situation) or to a second anchor point P2 itself connected to the home agent EA of the first mobile node T1 (macromobility situation).

Both methods can be used in an IP network supporting hierarchical mobility management, on the one hand when the first mobile node T1 has set up an IP call with the second node T2 via its home agent EA, the first anchor point P1 and the first access equipment R1 and on the other hand when the first mobile node T1 is roaming and has detected the second access equipment R2 or R3.

At this stage, the first mobile node T1 is configured with a local care-of address LCoA-1 and a regional care-of address RCoA-1. Moreover, the regional care-of address LCoA-1 is on the one hand stored in the database of the home agent EA in corresponding relationship to the IP home address and on the other hand known to the first anchor point P1. Moreover, the local care-of address LCoA-1 is known to the first access router R1 and to the anchor point P1 (where it is stored in corresponding relationship to the regional care-of address RCoA-1).

The first method of the invention is dedicated to micromobility. It consists of a combination of three successive steps described in detail hereinafter with reference to FIG. 2.

Figure 2:
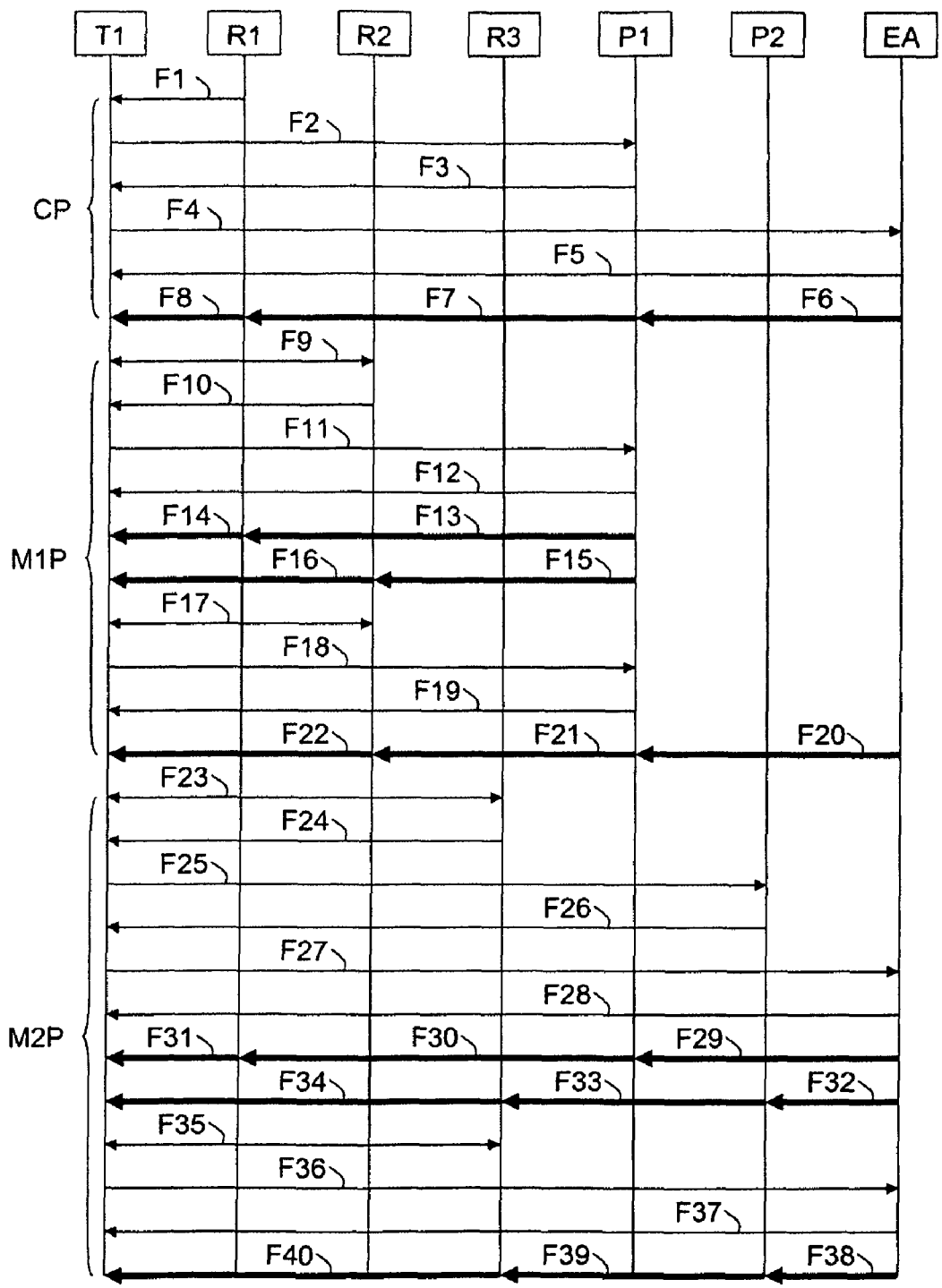
FIG. 2 is a diagram of the main operations implementing examples of first and second handover methods of the invention in the IP network using hierarchical mobility management shown in FIG. 1.

As shown in FIG. 2, the operations of the first method are grouped together by a brace M1P beginning at the two-way arrow F9 and ending at the arrow F22.

The arrows F1 to F8 represent the standard connection phase CP well known to the person skilled in the art during which the first mobile node T1 connects to a first access router R1 belonging to a first access subnetwork connected to the home network containing the home agent EA of said first mobile node T1 via a first mobility anchor point P1.

The arrow F1 represents a step during which the first access router R1 sends the first mobile node T1 a router advertisement (RA) type message including its address prefix (or network address) and preferably the address of the anchor point to which it is connected, generally in broadcast mode and via each of the interfaces of the access router R1.

On receiving this message, the first mobile node T1 extracts the address prefix from it in order to construct a first local care-of address LCoA-1 and a first regional care-of address RCoA-1, for example using a stateless autoconfiguration procedure AutoConf.

The first mobile terminal T1 then generates a local binding update message including its first local care-of address LCoA-1 and its first regional care-of address RCoA-1 and sends the message to the first anchor point P1 (F2) to which the first access router R1 is connected in order for it to store these addresses. The protocol used in this step is preferably HMIPv6.

On receiving this message, the first anchor point P1 stores the first local care-of address LCoA-1 and the first regional care-of address RCoA-1 in its database. It then generates a binding acknowledgement message to the first mobile node T1 (F3) to inform it that it has stored these addresses.

The first mobile node T1 then sends its home agent EA (F4) a binding update message containing its first regional care-of address RCoA-1 and its IP home address. On receiving this message, the home agent EA stores the first regional care-of address RCoA-1 in its database in corresponding relationship to the IP home address. It then generates a binding acknowledgement message to the first mobile node T1 (F5) to inform it that it has stored its first regional care-of address RCoA-1.

The first mobile node T1 now being registered with its home agent EA and the first anchor point P1, data packets coming from a second (possibly mobile) node T2 can be forwarded to it in the conventional way via its home agent EA (F6), the first anchor point P1 (F7) and the first access router R1 (F8).

It is important to note that the connection phase CP described above is common to the first and second methods.

The first step i) of the first method of the invention is represented in FIG. 2 by the arrows F9 and F10. The first mobile node T1 is connected by a radio connection via a first interface to the base station that is connected to the first access router R1 and has detected (F9) a second access router R2 that is also connected to the first anchor point P1. If the first mobile node T1 is sufficiently close to the base station that is connected to the second access router R2, it can set up a radio connection via a second interface with that base station (F9) and therefore receive (F10) router advertisement type messages transmitted by the second access router R2 over each of its interfaces, which messages include its address prefix (or network address) and the address of the anchor points to which it is connected (here P1).

On receiving this message the first mobile node T1 extracts the address prefix from it in order to construct its second local care-of address LCoA-2 and its second regional care-of address RCoA-2, for example using a stateless autoconfiguration procedure AutoConf.

In a second step ii) (arrows F11 to F16), there are communicated to the first anchor point P1 the second local care-of address LCoA-2, the first regional care-of address RCoA-1 and an information bit (S) whose value indicates double temporary addressing, in order for the first anchor point P1 to store this second local care-of address LCoA-2 in corresponding relationship to the first regional care-of address RCoA-1 and then forward packets intended for the first mobile node T1 to the first access router R1 and the second access router R2 designated by the first local care-of address LCoA-1 and the second local care-of address LCoA-2.

To do this, the first mobile node T1 can send the first anchor point P1 (F11) a local binding update type message containing its second local care-of address LCoA-2, its first regional care-of address RCoA-1 and the information bit S whose value indicates double temporary addressing, for example. This information bit S is a data bit placed in the "reserved" field of a local binding update type message, for example. A value of S equal to 1 indicates double temporary addressing, for example. The protocol used in this step is preferably HMIPv6.

On receiving this message, the first anchor point P1 analyzes the value of the information bit S and if it is equal to 1 (for example) records the second local care-of address LCoA-2 in corresponding relationship to the first regional care-of address RCoA-1 in its database. It then generates a binding acknowledgement type message to the first mobile node T1 (F12) to inform it that it has made a record of the double temporary addressing.

The first anchor point P1 can then temporarily forward packets addressed to the first mobile node T1 not only to the first access router R1 but also to the second access router R2, both of which routers are designated by the first local care-of address LCoA-1 and the second local care-of address LCoA-2. This double transmission of the same data packets is indicated in FIG. 2 by the arrows F13 to F16. More precisely, the packets received by the first anchor point P1 from the home agent EA and addressed to the first mobile node T1 are on the one hand forwarded (F13) to the first access router R1 for it to communicate them (F14) to the first mobile node T1 and on the other hand forwarded (F15) to the second access router R2 for it to communicate them (F16) to the same first mobile node T1. This is possible because the first mobile node T1 is already connected to the first and second access routers R1 and R2 via its first and second interfaces and because the exchange of binding update type messages means that a tunnel between the first mobile network T1 and the first anchor point P1 through the second access router R2 has already been created.

For the first mobile node T1 to be able to exchange data with the first and second access routers R1 and R2 it is necessary on the one hand for it to have two dialog logical radio interfaces (see above), possibly coupled to the same send/receive antenna, and for it to be capable of integrating an information bit S into a field of a local binding update type message. The mobility anchor points must also have a control device adapted to analyze the information bit S and to store temporarily two local care-of addresses LCoA-1 and LCoA-2 in corresponding relationship to the same regional care-of address RCoA-1 in order to be able to transfer identical data in parallel to the two access routers designated by these two local care-of addresses LCoA-1 and LCoA-2 when the value of the information bit S that accompanies a second local care-of address LCoA-2 and a first regional care-of address RCoA-1 indicates double temporary addressing.

The mobility anchor point control device of the invention may take the form of electronic circuits, software (or electronic data processing modules) or a combination of circuits and software.

In a third step iii) (arrows F17 to F22), the handover is finalized first by disconnecting the first mobile node T1 from the first access router R1. To do this, the stored first local care-of address LCoA-1 of the first mobile node T1 is deleted at the first anchor point P1 in order for the latter to receive data packets (or datagrams) addressed to it only from the second access router R2.

The first mobile node T1 then generates a local binding update type message to the first anchor point P1 (F18) including its first local care-of address LCoA-1, its first regional care-of address RCoA-1 and data requesting the deletion of the record of these addresses. This data may be the "lifetime" field, for example, a value of 0 in which requires elimination of the record of these addresses. The protocol used in this substep is preferably HMIPv6.

On receiving this message, the first anchor point P1 deletes from its database the first local care-of address LCoA-1 stored in corresponding relationship to the first regional care-of address RCoA-1 itself stored in corresponding relationship to the second local care-of address LCoA-2. It then generates a binding acknowledgement type message to the first mobile node T1 (F19) in order to inform it that it has deleted the record of its old first local care-of address LCoA-1.

The first mobile node T1 now being stored at the first anchor point P1 with its second local care-of address LCoA-2 and its first regional care-of address RCoA-1, data packets coming from a second (possibly mobile) node T2 are now forwarded to it in the conventional way via its home agent EA (F20), the first anchor point P1 (F21) designated by the first regional care-of address RCoA-1 and the second access router R2 (F22) designated by the second local care-of address LCoA-2.

The second method of the invention is dedicated to macromobility. It consists in a combination of four successive steps described in detail hereinafter with reference to FIG. 2.

As shown in FIG. 2, the operations of the second method are grouped together by a brace M2P starting at the two-way arrow F23 and ending at the arrow F40.

The first step i) of the second method begins on the one hand when the first mobile node T2 has been stored at its home agent EA, from a first anchor point P1 and a first access router R1 (i.e. after the connection phase CP described above (arrows F1 to F8) has been effected) and on the other hand when the first mobile node T1 has detected (F23) a second access router R3 that is connected to a second anchor point P2 that is in turn connected to the home agent EA. As previously indicated, if the first mobile node T1 is sufficiently close to the base station that is connected to the second access router R3, it can set up a radio connection via a second interface with the base station (F23) and therefore receive (F24) router advertisement type messages transmitted by the second access router F3 over each of its interfaces that include its address prefix (or network address) and preferably the address of the anchor point to which it is connected.

On receiving this message, the first mobile node T1 extracts the address prefix from it in order to construct a second local care-of address LCoA-2 and a second regional care-of address RCoA-2, for example using a stateless autoconfiguration procedure AutoConf.

In a second step ii) (arrows F25 and F26), the second local care-of address LCoA-2 and the second regional care-of address RCoA-2 are communicated to the second anchor point P2 in order for it to store them in corresponding relationship to each other in its database.

To do this, the first mobile node T1 can generate a binding update type message to the second anchor point P2 (F25) to which the second access router R3 is connected, this message including its second local care-of address LCoA-2 and its second regional care-of address RCoA-2, in order for it to store them in its database. The protocol used in this substep is preferably HMIPv6.

On receiving this message, the second anchor point P2 stores the second local care-of address LCoA-2 and the second regional care-of address RCoA-2 in its database in corresponding relationship to each other. It then generates a binding acknowledgement type message to the first mobile node T1 (F26) in order to report to it that it has stored them.

In a third step iii) (arrows F27 to F34), there are communicated to the home agent EA the second regional care-of address RCoA-2, the IP home address of the first mobile node T1, and an information bit (S) having a value indicating double temporary addressing in order for it to store the second regional care-of address RCoA-2 in corresponding relationship to the IP home address and then forward packets addressed to the first mobile node T1 to the first and second anchor points P1 and P2 that are designated by the first and second regional care-of addresses RCoA-1 and RCoA-2 stored in corresponding relationship to the IP home address.

To do this, the first mobile node T1 can send its home agent EA (F27) a binding update type message, for example, containing its second regional care-of address RCoA-2, its IP home address and the information bit (S) whose value indicates temporary double addressing. As in the first method, this information bit S is a data bit that is placed in the "reserved" field in a binding update type message, for example. For example, a value of S equal to 1 indicates double temporary addressing. The protocol used in this substep is preferably HMIPv6.

On receiving this message, the home agent EA analyzes the value of the information bit S and if it is equal to 1 (for example) stores the second regional care-of address RCoA-2 in its database in corresponding relationship to the IP home address which is itself stored in corresponding relationship to the first regional care-of address RCoA-1. It then generates a binding acknowledgement type message to the first mobile node T1 (F28) in order to inform it that it has made a record of the double temporary addressing.

The home agent EA can then temporarily forward packets addressed to the first mobile node T1 not only to the first anchor point P1 but also to the second anchor point P2, both of which are designated by the first and second regional care-of addresses RCoA-1 and RCoA-2. This double forwarding of the same data packets is indicated in FIG. 2 by the arrows F29 to F34. More precisely, packets received by the home agent EA and addressed to the first mobile node T1 are on the one hand forwarded (F29) to the first anchor point P1 in order for it to communicate them to the first access router R1 (F30) and for the latter then to communicate them to the first mobile node T1 (F31) and on the other hand forwarded (F32) to the second anchor point P2 for it to communicate them to the second access router R3 (F33), in order for the latter then to communicate them to the same first mobile node T1 (F34). This is possible because the first mobile node T1 is already connected to the first and second access routers R1 and R3 via its first and second interfaces and because the exchange of binding update type messages has created a tunnel between the first mobile node T1 and the second anchor point P2 through the second access router R3.

As indicated above, for the first mobile node T1 to be able to exchange data with the first and second access routers R1 and R2 it must on the one hand have two dialog logic radio interfaces, possibly coupled to the same send/receive antenna, and on the other hand be able to integrate an information bit S into a binding update type message field. The home agent EA must also include a control device capable of analyzing the information bit S and temporarily storing two regional care-of addresses RCoA-1 and RCoA-2 in corresponding relationship to the same IP home address in order to be able to transfer identical data in parallel to the two anchor points P1 and P2 designated by these two regional care-of addresses RCoA-1 and RCoA-2 when the value of the information bit S that accompanies a second regional care-of address RCoA-2 and an IP home address indicates double temporary addressing.

The control device of a home agent EA of the invention can take the form of electronic circuits, software (or electronic data processing) modules or a combination of circuits and software.

In a fourth step iii) (arrows F35 to F40), handover is finalized first by disconnecting the first mobile node T1 from the first access router R1. To do this, the record of the first regional care-of address RCoA-1 of the first mobile node T1 is deleted in the home agent EA in order for the latter to receive data packets (or datagrams) addressed to it only from the second anchor point P2 via the second access router R2.

The first mobile node T1 then generates a binding update type message to the home agent EA (F36) including its first regional care-of address RCoA-1, its IP home address and information requesting the deletion of the record of these addresses. As in the first method, this information data can be in the "lifetime" field, for example, a value of 0 in which requires elimination of the stored addresses. The protocol used in this substep is preferably HMIPv6.

On receiving this message, the home agent EA eliminates from its database the first regional care-of address RCoA-1 stored in corresponding relationship to the IP home address itself stored in corresponding relationship to the second regional care-of address RCoA-2. It then generates a binding acknowledgement type message to the first mobile node T1 (F37) in order to inform it that it has deleted the stored old first regional care-of address RCoA-1.

The first mobile node T1 now being stored in its home agent EA with its second regional care-of address RCoA-2, data packets coming from a second (possibly mobile) node T2 are not forwarded in the conventional way via its home agent EA (F38), the second anchor point P2 (F39) designated by the second regional care-of address RCoA-2 and the second access router R3 (F40) designated by the second local care-of address LCoA-2 (stored in R3 after the substep F25).

It is important to note that the first and second methods described above may coexist in the same IP network using hierarchical mobility management in order to cover micromobility and macromobility situations. This requires that the mobile nodes be adapted to integrate an information bit (S) indicating double temporary addressing, both in local binding update type messages and in binding update type messages. This further requires home agents adapted in accordance with the invention to coexist with mobility anchor points also adapted in accordance with the invention.

The invention is not limited to the handover method, home agent equipment and mobility anchor point embodiments described above by way of example only and encompasses all variants that the person skilled in the art might envisage that fall within the scope of the following claims.

The invention claimed is:

1. A method of handing over a call involving a mobile equipment that has set up an IP call with a communication equipment via an agent equipment providing a home agent function for said mobile equipment, an anchor point including a control device configured to analyze an information bit and to temporarily store a first and a second local care-of address in corresponding relationship to a same regional care of address used to transfer identical data in parallel to the mobile equipment as designated by the first and a second local care-of addresses such that the local care-of address and the regional care-of address are used by the anchor point and the mobile equipment, respectively, and a first radio access equipment belonging to an Internet Protocol communication network using hierarchical mobility management, said mobile equipment having the first local and the regional care-of addresses stored at said anchor point, said method of handing a call over comprising:

detecting, by said mobile equipment, a second access equipment connected to said anchor point;

receiving, by said mobile equipment, the address prefix of said second access equipment;

constructing, by said mobile equipment, the second local care-of address based on the address prefix of said second access equipment, using a stateless autoconfiguration procedure;

communicating, by said mobile equipment, said second local care-of address, said first regional care-of address and the information bit having a value indicating double temporary addressing to said anchor point in order for said anchor point to store the second local care-of address in relationship to the first regional care-of address;

receiving, by said mobile equipment, packets addressed to said mobile equipment via the first and second access equipments and designated by said first and second local care-of addresses; and communicating using a local binding update type message, by said mobile equipment, a message requesting the anchor point to disconnect said mobile equipment from the first access equipment and to delete the first local care-of address of the mobile equipment stored at said anchor point in order to forward packets that are addressed to said anchor point to the mobile equipment via said home agent equipment, said anchor point and said second access equipment.

2. The method according to claim 1, wherein said second access equipment sends said mobile equipment a router advertisement type message including at least the address prefix of said second access equipment.

3. The method according to claim 1, wherein said mobile equipment constructs said second local care-of address using a stateless autoconfiguration procedure.

4. The method according to claim 1, wherein said mobile equipment communicates said second local care-of address, said first regional care-of address and said information bit to said anchor point using a local binding update type message.

5. The method according to claim 4, wherein said anchor point sends a local binding acknowledgement type message to said mobile equipment after storing said second local care-of address in relationship to said first regional care-of address.

6. The method according to claim 1, wherein said mobile equipment sends a local binding update type message to said anchor point including said first local and regional care-of addresses of said mobile equipment and requesting said anchor point to delete the record corresponding thereto so that said anchor point retains only the record of the second local care-of address in relationship to the first regional care-of address.

7. The method according to claim 6, wherein said anchor point sends a local binding acknowledgement type message to said mobile equipment after deleting the record of said second local care-of address in relationship to said first regional care-of address.

8. A method of handing over a call involving a mobile equipment that has set up an IP call with a communication equipment via an agent equipment providing a home agent function for said mobile equipment, a first anchor including a control device configured to analyze an information bit and to temporarily store a first and a second local care-of address in corresponding relationship to a same regional care of address used to transfer identical data in parallel to the mobile equipment as designated by the first and a second local care-of addresses such that the local care-of address and the regional care-of address are used by the anchor point and the mobile equipment, respectively, and a first radio access equipment belonging to an Internet Protocol communication network using hierarchical mobility management, said mobile equipment having first local and regional care-of addresses stored at said first anchor point and said home agent equipment, said method of handing over a call comprising:

detecting, by said mobile equipment, a second access equipment connected to said anchor point;

receiving, by said mobile equipment, the address prefix of said second access equipment;

constructing, by said mobile equipment, the second local and regional care-of addresses based on the address prefix of said second access equipment, using a stateless autoconfiguration procedure;

communicating using a local binding update type message, by said mobile equipment, said second local and regional care-of addresses to said first anchor point in order for said first anchor point to store the second local care-of address in relationship to the second regional care-of address;

communicating, by said mobile equipment, said second regional care-of address, an IP home address of said mobile equipment and the information bit having a value indicating double temporary addressing to said home agent equipment in order for said home agent equipment to store said second regional care-of address in relationship to said IP home address;

receiving, by said mobile equipment, packets addressed to said mobile equipment via the first and second anchor points and designated by said first and second regional care-of addresses stored in corresponding relationship to said IP home address; and communicating, by said mobile equipment, a message requesting the first anchor point to disconnect said mobile equipment from the first access equipment and to delete the first regional care-of address of the mobile equipment stored at said home agent equipment in relationship to said IP home address in order to forward packets that are addressed to said first access equipment to the mobile equipment via said home agent equipment, said second anchor point and said second access equipment.

9. The method according to claim 8, wherein said second access equipment sends said mobile equipment a router advertisement type message including at least said address prefix of said second access equipment.

10. The method according to claim 8, wherein said mobile equipment constructs said second local and regional care-of addresses using a stateless autoconfiguration procedure.

11. The method according to claim 8, wherein said mobile equipment communicates said second local and regional care-of addresses to said second anchor point using a binding update type message.

12. The method according to claim 11, wherein said second anchor point sends a binding acknowledgement type message to said mobile equipment after storing said second local care-of address in relationship to said second regional care-of address.

13. The method according to claim 8, wherein said mobile equipment sends said second regional care-of address, IP home address and information bit to said home agent equipment using a binding update type message.

14. The method according to claim 13, wherein said home agent equipment sends a binding acknowledgement type message to the mobile equipment after storing said second regional care-of address in relationship to said IP home address and said first regional care-of address.

15. The method according to claim 8, wherein said mobile equipment sends to said home agent equipment a binding update message including said first regional care-of address and said IP home address and requesting said home agent to delete the record of said first regional care-of address so that said home agent equipment retains only the record of the second regional care-of address in corresponding relationship to the IP home address.

16. The method according to claim 15, wherein said home agent equipment sends to said first mobile equipment a binding acknowledgement type message after deleting the record of said first regional care-of address.

17. A mobility anchor point for an Internet protocol communication network using hierarchical mobility management configured to implement a portion of a handover method according to claim 1.

18. A home agent equipment for an Internet protocol communication network using hierarchical mobility management configured to implement a portion of a handover method according to claim 1.

19. The method according to claim 1, wherein said communication network is a MIPv6 type communication network using hierarchical mobility management.

20. A home agent equipment according to claim 18, wherein said communication network is an MIPv6 type communication network.

* * * * *